United States Patent
Zapp

(10) Patent No.: US 9,821,997 B2
(45) Date of Patent: *Nov. 21, 2017

(54) SPOUT AND DISPENSING SYSTEM

(71) Applicant: Automatic Bar Controls, Inc., Vacaville, CA (US)

(72) Inventor: Achim Philipp Zapp, Shenzhen (CN)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,329

(22) Filed: Nov. 22, 2016

(65) Prior Publication Data
US 2017/0073209 A1    Mar. 16, 2017

Related U.S. Application Data

(63) Continuation of application No. 14/474,696, filed on Sep. 2, 2014, now Pat. No. 9,533,870, which is a
(Continued)

(51) Int. Cl.
*B67D 3/00*   (2006.01)
*B67D 3/04*   (2006.01)
*G01F 13/00*  (2006.01)

(52) U.S. Cl.
CPC ......... *B67D 3/0041* (2013.01); *B67D 3/0006* (2013.01); *B67D 3/0077* (2013.01); *B67D 3/041* (2013.01); *G01F 13/006* (2013.01)

(58) Field of Classification Search
CPC .... B67D 3/041; B67D 3/0077; B67D 3/0006; B67D 3/0041; G01F 13/006
(Continued)

(56) References Cited

U.S. PATENT DOCUMENTS

| | | |
|---|---|---|
| 2,395,653 A | 2/1946 | Attwood |
| 2,895,653 A | 7/1959 | Giepen |

(Continued)

FOREIGN PATENT DOCUMENTS

| | | |
|---|---|---|
| CA | 2847719 | 3/2013 |
| CN | 86103690 | 2/1987 |

(Continued)

OTHER PUBLICATIONS

PCT/CN2009/000280, "International Search Report", dated Jun. 18, 2009, 5.

(Continued)

*Primary Examiner* — Donnell Long
(74) *Attorney, Agent, or Firm* — Kilpatrick Townsend & Stockton LLP

(57) ABSTRACT

The present invention is related to a pouring device for a container for the dosing of liquid, said pouring device comprising: a) a housing b) a passage for the liquid within the housing; c) an electrical operated opening/closing mechanism for opening or closing the passage in order to dosing of a predetermined or registerable amount of liquid, characterized in that the passage comprising a flexible tube, and the opening/closing mechanism is to block the tube by squeezing the tube in order to close the passage. The tube inside the spout is the only path for the liquid to go through from the bottle, meanwhile the rest components are protected from liquid. This guaranties a quick and controlled flow of the liquid and avoids any air bubbles to influence the pour precision.

19 Claims, 5 Drawing Sheets

Related U.S. Application Data continuation of application No. 12/117,230, filed on May 8, 2008, now abandoned.

(58) Field of Classification Search
USPC ....... 222/52, 63, 23, 37, 211, 212, 566, 567, 222/333, 504, 36, 213, 214
See application file for complete search history.

(56) References Cited

U.S. PATENT DOCUMENTS

| | | | |
|---|---|---|---|
| 3,650,439 A | 3/1972 | Shimooka |
| 3,827,467 A | 8/1974 | Henley et al. |
| 3,920,149 A | 11/1975 | Fortino |
| 3,940,036 A | 2/1976 | Parker |
| 3,993,218 A | 11/1976 | Reichenberger |
| 4,261,485 A | 4/1981 | Borg |
| 4,265,370 A | 5/1981 | Reilly |
| 4,282,562 A | 8/1981 | Marino et al. |
| 4,349,042 A | 9/1982 | Shimizu |
| 4,436,223 A | 3/1984 | Wilson |
| 4,653,719 A | 3/1987 | Cabrera et al. |
| 4,660,744 A | 4/1987 | Csaszar |
| 4,736,871 A | 4/1988 | Luciani et al. |
| 5,044,521 A | 9/1991 | Peckels |
| 5,255,819 A | 10/1993 | Peckels |
| 5,255,822 A | 10/1993 | Mease et al. |
| 5,318,197 A | 6/1994 | Martindale et al. |
| 5,379,916 A | 1/1995 | Martindale et al. |
| 5,397,027 A | 3/1995 | Koch et al. |
| 5,505,349 A | 4/1996 | Peckels |
| 5,527,295 A | 6/1996 | Wing |
| 5,603,430 A | 2/1997 | Loehrke et al. |
| 5,909,100 A | 6/1999 | Shimada et al. |
| 5,947,167 A | 9/1999 | Bogen et al. |
| 6,036,055 A | 3/2000 | Mogadam et al. |
| 6,220,484 B1 | 4/2001 | Martindale |
| 6,394,411 B1 | 5/2002 | Hafner et al. |
| 6,409,046 B1 | 6/2002 | Peckels |
| 6,554,589 B2 | 4/2003 | Grapes |
| 6,892,166 B2 | 5/2005 | Mogadam |
| 7,109,863 B2 | 9/2006 | Morrison et al. |
| 7,272,537 B2 | 9/2007 | Mogadam |
| 7,477,039 B2 | 1/2009 | Rodarte |
| 7,699,993 B2 | 4/2010 | Larkner et al. |
| 7,750,817 B2 | 7/2010 | Teller et al. |
| 7,900,799 B2 | 3/2011 | Kuzar et al. |
| 8,410,753 B2 | 4/2013 | Opolka |
| 8,608,026 B1 | 12/2013 | Temko et al. |
| 8,695,858 B2 | 4/2014 | Zapp |
| 8,925,769 B2 | 1/2015 | Zapp et al. |
| 2001/0011025 A1 | 8/2001 | Ohki et al. |
| 2002/0171559 A1 | 11/2002 | Yang |
| 2004/0210405 A1 | 10/2004 | Mogadam |
| 2004/0211790 A1 | 10/2004 | Werth |
| 2005/0263547 A1 | 12/2005 | Jensen et al. |
| 2006/0018187 A1 | 1/2006 | Donna et al. |
| 2006/0027268 A1 | 2/2006 | Zapp |
| 2006/0283882 A1 | 12/2006 | Escobar et al. |
| 2008/0195251 A1 | 8/2008 | Milner et al. |
| 2009/0230157 A1 | 9/2009 | Lindberg |
| 2009/0277931 A1 | 11/2009 | Zapp |
| 2010/0174337 A1 | 7/2010 | Stahmann et al. |
| 2011/0016968 A1 | 1/2011 | Eichholz et al. |
| 2011/0036873 A1 | 2/2011 | Peckels |
| 2011/0255996 A1 | 10/2011 | Wickstead et al. |
| 2011/0309103 A1 | 12/2011 | Heatherly et al. |
| 2012/0211516 A1 | 8/2012 | Zapp et al. |
| 2013/0056502 A1 | 3/2013 | Zapp |
| 2014/0367411 A1 | 12/2014 | Zapp |

FOREIGN PATENT DOCUMENTS

| | | |
|---|---|---|
| DE | 10305441 | 9/2003 |
| EP | 1227058 | 7/2002 |
| GB | 582032 | 11/1946 |
| GB | 1001208 | 8/1965 |
| JP | 2000161533 | 6/2000 |
| WO | 8607625 | 12/1986 |
| WO | 9319349 | 9/1993 |
| WO | 2007144002 | 12/2007 |
| WO | 2011133783 | 10/2011 |
| WO | 2013036608 | 3/2013 |

OTHER PUBLICATIONS

PCT/US2012/053917, "International Preliminary Report on Patentability", dated Mar. 20, 2014, 8 pages.
PCT/US2012/053917, "International Search Report and Written Opinion Received", dated Mar. 15, 2013, 11 pages.
PCT/US2012/053955, "International Preliminary Report on Patentability", dated Mar. 20, 2014, 5 pages.
PCT/US2012/053955, "International Search Report and Written opinion", dated Feb. 15, 2013, 9 Pages.

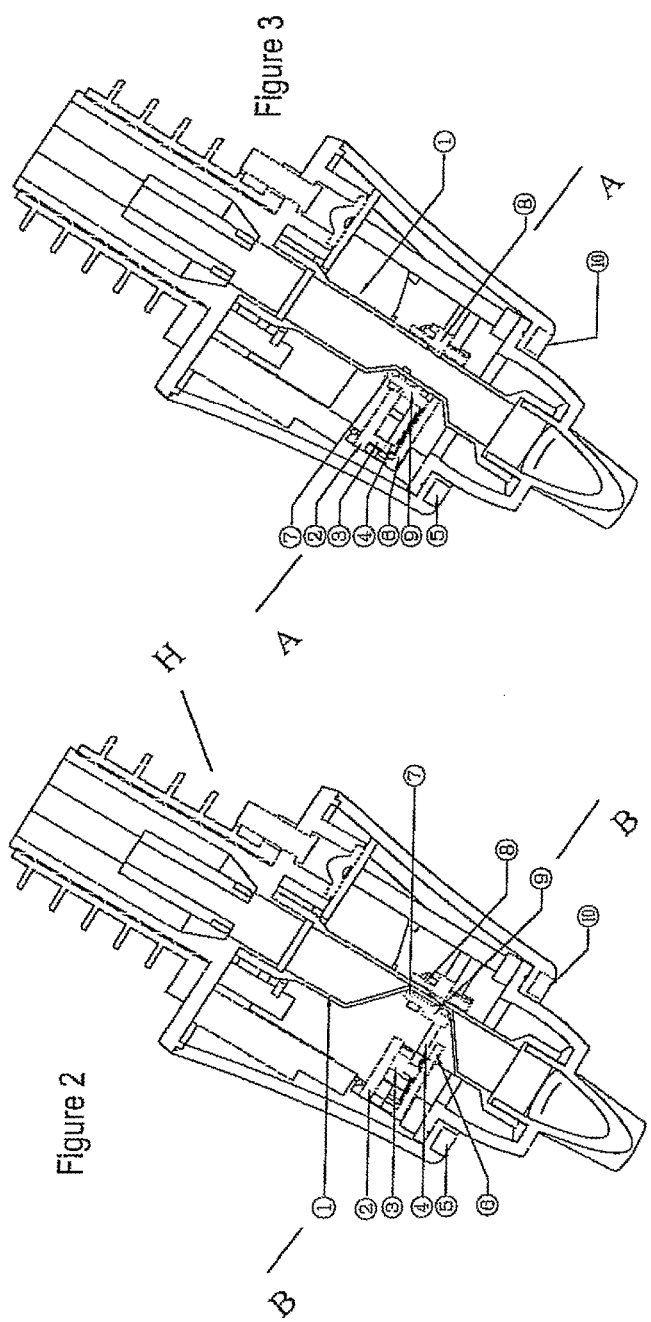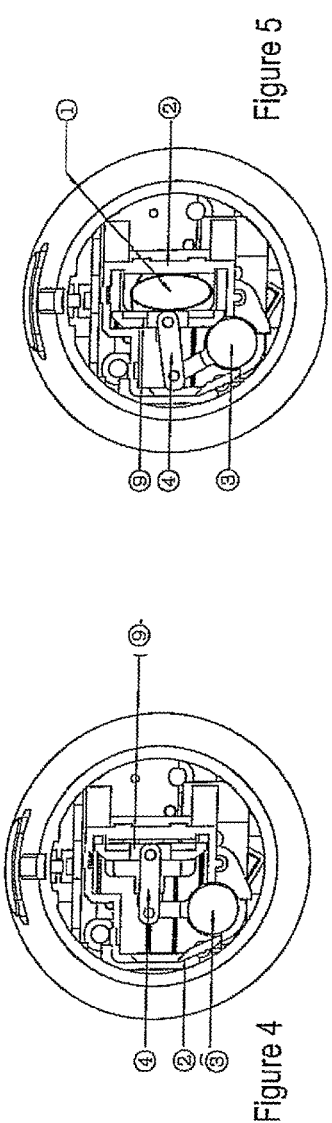

SPOUT AND DISPENSING SYSTEM

CROSS REFERENCE TO RELATED APPLICATIONS

This application claims the benefit of U.S. Ser. No. 14/474,696, filed Sep. 2, 2014, titled "Wireless Spout and Dispensing System," now allowed, which application claims of U.S. Ser. No. 12/117,230, filed May 8, 2008, titled "Wireless Spout and System for Free and Pre-Measured Dispensing," the entire contents of which are hereby incorporated by reference.

BACKGROUND OF THE INVENTION

1. Field of the Invention

The invention is directed towards system for monitoring amount of liquid poured from liquid containers.

2. Description of Related Prior Art

The amount of liquids dispensed from liquid containers need to be monitored for many endeavors today. For instance, the management of establishments has long found it necessary to carefully monitor the relationship between liquor dispensed and receipts by controlling the quantity of liquor dispensed from a specific bottle and recording the sale.

A few systems have been proposed to date for measuring and recording the amount of liquid dispensed from liquid containers. One such system includes a spout that is configured to attach to an opening of a liquid container. This spout also uses a portion-control mechanism to control the desired amount of liquid poured from the liquid container. The spout includes a radio transmitter for emitting signals containing activity information. A receiver receives the transmitted signals, and provides these signals to a computer at the establishment at processes the signals into text for viewing.

FIG. 1 shows side-cross sectional view of a free-pour spout in US20040210405 or U.S. Pat. No. 6,892,166. This spout is used to be mounted on an open orifice of a liquid container and measures the amount of liquid poured from the liquid container. The spout includes a rigid fluid-flow passageway 305, a breather tube 310, a printed circuit board (PCB) 315 with a number of electronic components, a battery (not shown), an LED (not shown), and an engage switch 340 (including seal/sense switch 350, a spring-biased button 345). The reference number 306 shows the direction of fluid flow. The dimensions of the fluid-flow passageway are specifically selected to ensure laminar fluid flow of liquid when the liquid-container and hence the spout are inclined at a certain angle (e.g., 20.degree.) past the horizontal axis of the liquid-container. It also a detection circuit that detects fluid flow through the passageway. In addition, this spout has a measuring circuit that generates data relating to fluid flow when the detection circuit detects fluid flow through the passageway.

As in US20040210405, a RF Transceiver is provided to communicate with an outside master Unit for dispensing data. To measure the pour, a detection circuit is provided to detect a pour event.

US20040210405 also disclosed a breather tube provides an air inlet (vent) 307 that allows better fluid flow through the passageway and an engage switch (bottle presence bottom) is forced by on-off button that springs up and seals a sense switch the PCB when the bottom portion is inserted into a liquid container. When the bottom portion is removed from the liquid container, the on-off button springs back and thereby opens the sense switch.

However, the spout in U.S. Pat. No. 6,892,166 is free-pour and it is only measure the amount of liquid poured. There is a need to pour the liquid in a controlled predetermined amount. To avoid excess liquid is poured, an additional control unit outside is necessary to stop it. Even with this additional control unit outside, due to a control time lapse and difference in position between detection and control, it is unlikely to have a precious control in pouring of liquid.

US2005/0263547 describes a pouring stopper. In this known pouring stopper, the magnetic force with said stopper is provided by a coil which affects an armature so that a gasket at both ends of the rod may be caused to assume two positions, where the first position allows filling of liquid from a bottle into a liquid chamber, while the second position is intended to empty the liquid chamber. The magnet arrangement itself, which consists of a coil and a spring-biased armature, is seated extension of the liquid chamber. The coil itself is seated externally on a bottle holder, which means that the pouring stopper cannot be used for hand pouring.

WO2007144002 discloses a pouring stopper for a container, the pouring stopper being opened and closed on the basis of magnetizable rod or plate moved by a coil, the coil and the magnetizable rod or plate are disposed within the liquid chamber. However, the magnetizable rod and a coil is power all the time while the spout is open, which asks high power consumption. And the electronic parts might have the risk of wetting by the liquid (i.e. not being liquid proof).

However, due to the large size of the magnetizable rod and the coil to move the magnetizable rod in WO20007144002 or US2005/0263547, there is a need for a compact and simple pour apparatus that measures the amount of dispensed liquid in a controlled fashion without requiring manual activation.

Moreover, due to the compact and non-disassemble of the current spout in U.S. Pat. No. 6,892,166, when the energy of the battery is used up, the whole spout should be disposed. Therefore, there is also a need to reuse the spout such as recharging the battery.

SUMMARY OF THE INVENTION

The main feature of the invention is that a silicone tube inside the spout is the only path for the liquid to go through from the bottle without any restrictions. Meanwhile the rest components are protected from/isolated with liquid (i.e. liquid proof). Thus, the rest components are per se not necessary to be liquid proof. This also guaranties a quick and controlled flow of the liquid and avoids any air bubbles to influence the pour precision.

The silicone tube can be easily squeezed to stop the liquid flow. This can be done by a stepping motor, a motor with gearbox or any other motor.

To ensure that the dosing of liquid from the pour spout is always uniform and accurate it is advantageous that the liquid indicator is sealed into the silicone tube, as it makes it possible to register whether liquid flowing out of the pourer during the entire period of which is pre- or not pre-determined.

Especially, the present invention is to provide a pouring device for a container for the dosing of liquid, said pouring device comprising: a) a housings; b) a passage for the liquid within the housing; c) an electrical operated opening/closing mechanism for opening or closing the passage in order to dosing of a predetermined or registerable amount of liquid, characterized that the passage comprising a silicone tube, and the opening/closing mechanism is to block the silicone tube by squeezing the silicone tube in order to close the passage.

The silicone tube is normally close, and wherein the dosing of liquid is activated by the opening/closing mechanism. The silicone tube is enclosed and pressed by a slide in a condition of normally close.

It further comprises an air inlet valve that is opened for pouring and closed in non-pouring status driven by motor action.

The opening/closing mechanism is operated by a motor.

It further comprises a measuring circuit with multi angle detection that generates data relating to fluid flow through the passage when the detection circuit detects a pour event. The multi angle detection is different to known one or two angle detection. With such multi angle detection, once the tilt process has started, the flow rate can be exactly determined by the measuring circuit such as every 250 ms permanently. To reach the desired pouring quantity, the pouring by opening the silicone tube will be delayed/adjusted according to the bottle tilt position.

The above and other objects, features and advantages of the present invention will be more apparent and more readily appreciated from the following detailed description of preferred exemplary embodiments of the present invention, taken in connection with the accompanying drawings, in which:

BRIEF DESCRIPTION OF THE DRAWINGS

FIG. 2 is the longitudinal section of the pouring device of the present invention in closed position.

FIG. 3 is the longitudinal section of the pouring device of the present invention open position.

FIG. 4 is the cross-section of the pouring device of FIG. 2 along B-B in closed position.

FIG. 5 is the cross-section of pouring device of FIG. 3 along A-A in open position.

DETAILED DESCRIPTION OF THE PREFERRED EMBODIMENTS

Figure 1:
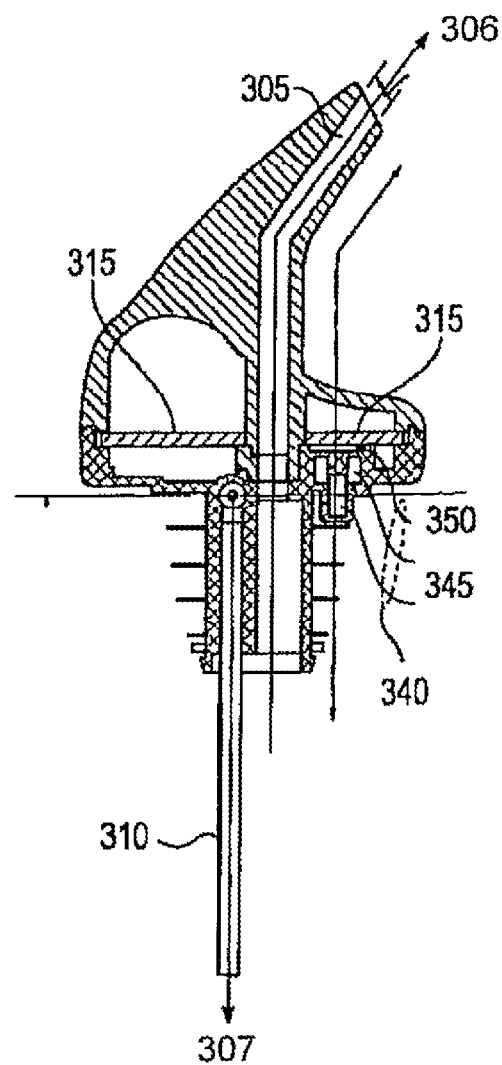
FIG. 1 shows the side-cross sectional view of a free-pour spout in US20040210405 or U.S. Pat. No. 6,892,166.

FIGS. 2-5 show a pouring device mounted onto a container (not shown) for dosing of liquid. Said pouring device comprises a compact housing H configured to seal an opening of the container. A passage (which is at least one portion being in the form of a flexible silicone tube 1) is provided within the housing H for liquid to pass through. An opening/closing mechanism disposed within the compact housing opens or closes the passage in order to dose a predetermined or registerable amount of liquid. In order to close the passage, the silicone tube 1 is squeezed/pressed by the opening/closing mechanism to block the passage. The passage/silicone tube is preferably normally close as shown in FIG. 2 (but it might be normally open in some case), and the dosing of liquid is activated by the opening/closing mechanism, which is controlled by a microprocessor (not shown) within the housing.

To ensure that the dosing of liquid from the pour spout is always uniform and accurate, it is advantageous that a liquid indicator (not shown) is sealed inside the bottom housing (FIG. 6 & FIG. 7), as it makes it possible to register whether liquid flows out of the pourer during the entire period of time which is pre-determined.

As shown in FIG. 2, the silicone tube 1 is enclosed and pressed by a slide 9 and a slide guide 2 (box bottom) & 6 (box top). The opening/closing mechanism is in a condition of normally close (see in FIG. 4). A motor and a gearbox (not shown) are provided to activate the opening/closing mechanism. The function of the opening/closing mechanism is similar to a pinch valve (see U.S. Pat. No. 6,554,589), which is comprised of a clamp mechanism operative to clamp a piece of flexible tubing. Generally a clamp or plunger will squash the tubing flat against a surface to cut off the flow of fluid through the tube.

To close the tube or stop the pouring, the motor turns, for example, clockwise (i.e. from FIG. 5 to FIG. 4), an arm head 3 (rotated by the motor) presses the slide 9 via a pivotally link lever 4 to close the tube 1 into a close position where liquid is stopped. When the motor turns anti-clockwise (that is, from FIG. 4 to FIG. 5), the arm head 3 is released via the pivotally link lever 4 such that the slide 9 is moved away by the motor and gearbox force to open the tube 1 in an open position where liquid is dispensing.

Moreover, it is also due to pressure from the flowing fluid and by the elastic nature of the flexible tube 1 springing back into shape. In case of using sugar containing products the silicone tube might glue together and the tube do not come back to its original open position. To avoid this, the outer parts of silicone with one point fixed 8 (Silicone holder-B) and the other point 7 (Silicone holder-A) moves always with the slide 9 to enforce the opening of the silicone tube by the slide 9 driven by the motor. The motor is preferably a careless permanent magnetic DC motor.

Figure 8:
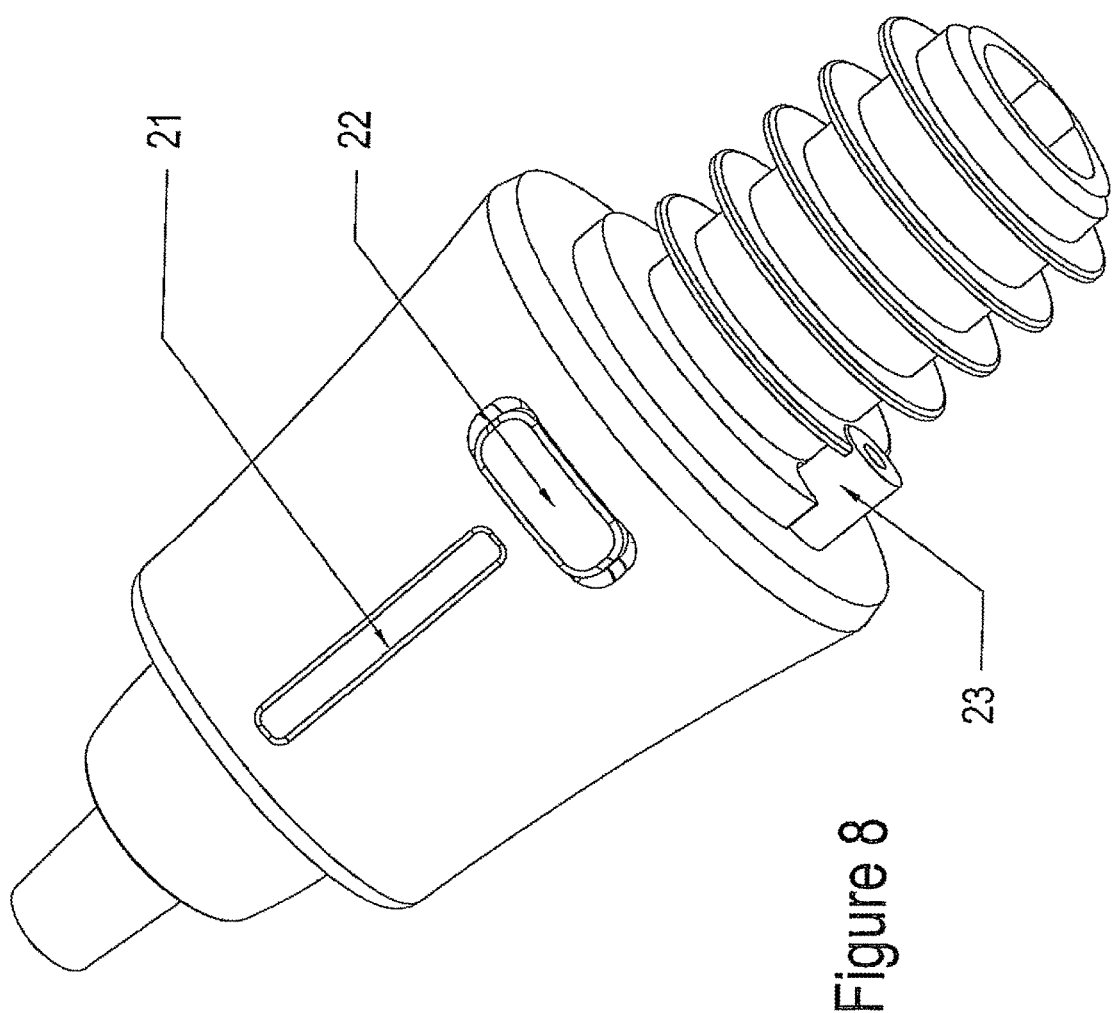
FIG. 8 is an exploded view of the pouring device of the present invention.

As shown in FIG. 8, a bottle presence sensor 23 (similar to US20040210405) is provided to send an alarm signal when the spout is on or off the bottle, to avoid any pouring without the pouring device.

Figure 9:
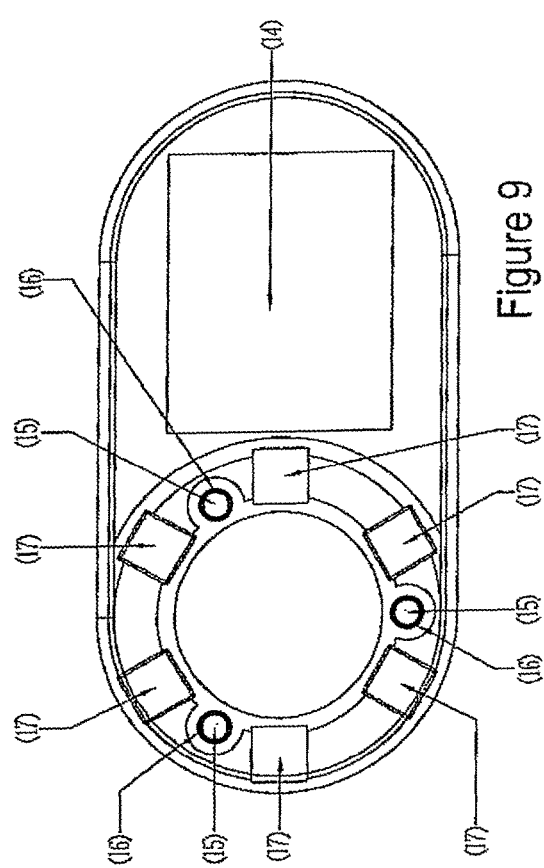
FIG. 9 is the cross-section of a charger for the pouring device.
Figure 10:
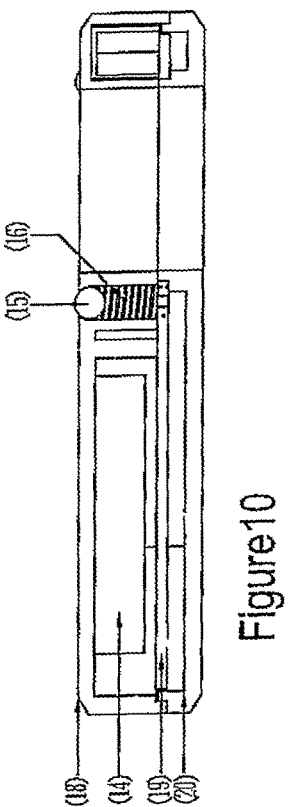
FIG. 10 is the longitudinal section of the charger in FIG. 9.
Figure 11:
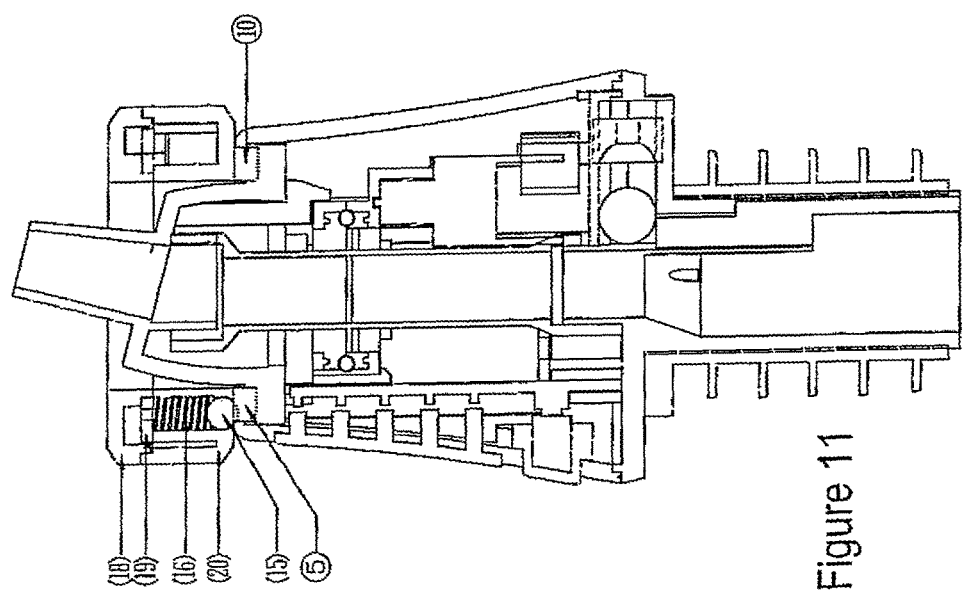
FIG. 11 is the longitudinal section of the charger used with the pouring device.

However, due to the compact and non-disassemble of the current spout in U.S. Pat. No. 6,892,166, when the energy of the battery is used up, the whole spout should be disposed. Therefore, there is a need to reuse the spout such as recharging the battery. However, if a power input port is provided on the housing, there is a risk of damage the electronic parts inside. Thus, as shown in FIGS. 9, 10 and 11, a pair of metal inserts 5 (Charge metal-A) & 10 (Charge metal-B) are provided on the housing for a mobile charger (not shown) to get attached to the spout to charge the battery inside the spout. In the present invention, metal inserts 5 & 10 would be a pair of metal rings or arcuate contacts (preferably steel) on the spout, such that a mobile charger with magnets can be attached to the spout.

A liquid detection is also provided to ensure that the dosing of liquid from the pour spout always uniform and accurate. In the present invention, it is advantageous that the liquid indicator is sealed into the bottom housing, as it makes it possible to register whether liquid flows out of the pourer during the entire period of time which is pre- or not pre-determined.

As shown in FIG. 8, the pouring device is provided with an indictor 21 (such as a series of LEDs) and an activation/selection button 22. The activation/selection button 22 can be silicone rubber which is pressed by finger to actuate the pouring device or to have any selection by consecutive pressing as indicated by indictor 21. However, to make the pouring device more water-proof and avoid any pressing stuck by sugar containing products, a touch-sensor is used as activation/selection button 22.

Figure 7:
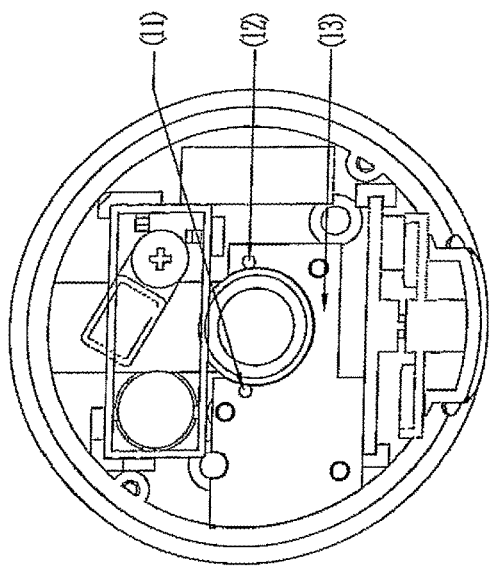
FIG. 7 is the cross-section of the pouring device of FIG. 6.
Figure 6:
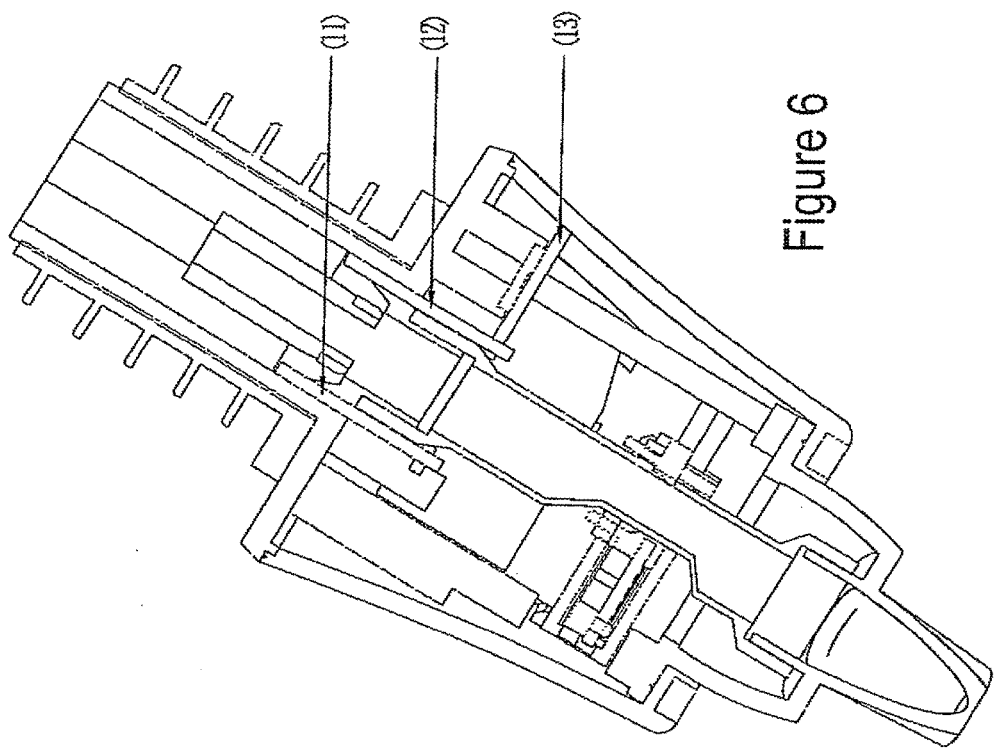
FIG. 6 is the longitudinal section of the pouring device of the present invention in open position of FIG. 3 showing the position of liquid presence detectors.

FIGS. 6-7 show the position of liquid presence detectors 11, 12 around the silicone tube. A PCB 13 for liquid presence detectors is also provided.

FIGS. 9-11 show a mobile charger used for the pouring device. The charger box bottom is denoted by 18 and the charger box top is denoted by 20. The charger comprises a charger housing with a shape adapted to be mounted on the pouring device (see FIG. 10) to recharge the battery of the pouring device. That is, charger housing has a cavity for the pouring device to be passed through. Around the cavity, several magnets 17 are provided so as to mount the charger firmly to the pouring device by magnetic force with metal inserts 5 & 10 on the pouring device. As in the usual, a charger circuit (indicated as PCB 19) and a battery 14 are provided. Therefore, three circumferentially spaced charging points are able to detect the two metal inserts in any position such that the pouring device can be recharged in any place by the charger remotely to any electrical power. After the charging of the pour device, the charger can be removed, and than mounted to another pouring device until the power is used up or placed back in recharging station. If so, the pouring device can be recharge remotely to any with power source. The electric contact between the pour device and charger is via the metal inserts 5 & 10 and the spring contacts (i.e. comprised by metal ball (e.g. steel ball) 15 and spring 16).

In some case, the opening/closing mechanism can be further controlled by a watch that is worn by the operator until an authorized signal of the watch is received. RF Transceiver in the pouring device will sent data together with such authorized signal. Therefore, the system can record who handle such pour.

For example, a pair of springs (not shown) is positioned between the slide 9 and the slide guide and the arm head 3 directly contact the slide 9 (i.e. without the pivotally link lever 4) such that in order to open the tube, the slide 9 is pushed away the tube 1 by the pair of springs. Similarly, to close the tube 1, the arm head 3 rotated by the motor and gearbox force would contact the slide 9 against the springs.

It is understood, therefore, that the invention is capable of modification and therefore is not to be limited to the precise details set forth. Rather various modifications may be made in the details within the scope and range of equivalents of the claims without departing from the spirit of the invention.

What is claimed is:

1. A pouring device for a container for the dosing of liquid, the pouring device comprising:
   a) a compact housing configured to seal an opening of the container;
   b) a flexible tube for liquid passage through the compact housing; and
   c) an electrically operated opening/closing mechanism disposed within the compact housing, the electrically operated opening/closing mechanism comprising (i) a motor and (ii) at least one slide arm cooperable with the motor, the at least one slide arm having an end that is secured to the tube such that the tube moves with the at least one slide arm,
   wherein the at least one slide arm pinches the tube closed in a normally closed, non-pouring position,
   wherein activation of the motor causes the slide arm to pull the tube apart in order to allow liquid passage through the tube;
   d) a measuring circuit with multi-angle detection that generates data relating to fluid flow through the tube when a pour event is detected; and
   e) one or more mobile charging features on an upper portion of the compact housing that cooperate with a mobile charger that can be attached over the pouring device for charging a battery inside the compact housing while the pouring device is in position on the container.

2. The pouring device of claim 1, wherein the electrically operated opening/closing mechanism is operated by a gearbox and the motor.

3. The pouring device of claim 1, wherein an outer wall of the flexible tube is fixedly secured to the at least one slide arm in order to prevent tube walls from sticking together by forcing the tube back to its original position upon movement of the at least one slide arm.

4. The pouring device of claim 1, further comprising an air inlet valve that is opened for pouring and closed for non-pouring status.

5. The pouring device of claim 1, wherein the one or more mobile charging features comprise two metal inserts on the compact housing to charge the battery, and to send and receive data with a mobile charger.

6. The pouring device of claim 5, further comprising a mobile charger with two or more magnets configured to mount the mobile charger to the metal inserts of the pouring device in order to remotely charge the pouring device.

7. The pouring device of claim 1, further comprising a detection circuit that detects a pour event as a free flow version and keeps the flexible tube permanently open.

8. The pouring device of claim 1, wherein a registerable amount of liquid can be selectively dosed in one of a predetermined mode and a free flow mode.

9. The pouring device of claim 1, wherein the pouring device comprises LED indicators and an activation/selection button.

10. The pouring device of claim 9, wherein the activation/selection button comprises a touch-sensed button.

11. The pouring device of claim 1, further comprising a liquid indicator sealed into the compact housing.

12. The pouring device of claim 1, further comprising a bottle presence sensor.

13. The pouring device of claim 1, further comprising a mobile charger comprising a shape adapted to be mounted on the pouring device in order to recharge a battery of the pouring device.

14. The pouring device of claim 1, wherein the electrically operated opening/closing mechanism is controlled by a device associated with an operator that relays an authorized signal.

15. The pouring device of claim 14, wherein the device is worn by the operator.

16. The pouring device of claim 1, wherein the electrically operated opening/closing mechanism is controlled by an RF transceiver in the pouring device.

17. The pouring device of claim 1, wherein the electrically operated opening/closing mechanism further comprises a link lever pivotally connected between the slide arm and the motor.

18. The pouring device of claim 1, further comprising a mobile charger with a charger housing adapted to be mounted on the pouring device to recharge the battery of the pouring device.

19. The pouring device of claim 18, wherein the charger housing comprises a cavity for the pouring device to be passed through.

* * * * *